United States Patent
Singh et al.

(10) Patent No.: US 10,534,563 B2
(45) Date of Patent: Jan. 14, 2020

(54) METHOD AND SYSTEM FOR HANDLING AN ASYNCHRONOUS EVENT REQUEST COMMAND IN A SOLID-STATE DRIVE

(71) Applicant: SAMSUNG ELECTRONICS CO., LTD., Suwon-si, Gyeonggi-do (KR)

(72) Inventors: Vikram Singh, Karnataka (IN); Abhinav Kumar Singh, Karnataka (IN); Chandrashekar Tandavapura Jagadish, Karnataka (IN)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 17 days.

(21) Appl. No.: 15/887,237

(22) Filed: Feb. 2, 2018

(65) Prior Publication Data
US 2018/0225065 A1    Aug. 9, 2018

(30) Foreign Application Priority Data
Feb. 7, 2017  (IN) .............................. 201741004479

(51) Int. Cl.
*G06F 3/06* (2006.01)
*G06F 13/42* (2006.01)
*G06F 13/24* (2006.01)

(52) U.S. Cl.
CPC .......... *G06F 3/0659* (2013.01); *G06F 3/0604* (2013.01); *G06F 3/0679* (2013.01); *G06F 13/4226* (2013.01); *G06F 13/24* (2013.01)

(58) Field of Classification Search
CPC .... G06F 3/0659; G06F 3/0617; G06F 3/0688; G06F 13/4226; G06F 3/0679; G06F 3/0604; G06F 13/24
USPC ................................. 710/313, 5, 6; 711/103
See application file for complete search history.

(56) References Cited

U.S. PATENT DOCUMENTS

| | | | | |
|---|---|---|---|---|
| 8,631,284 B2* | 1/2014 | Stevens | ............... | G06F 11/0745 714/25 |
| 2006/0095693 A1* | 5/2006 | Aida | ..................... | G06F 3/0613 711/154 |
| 2008/0005311 A1* | 1/2008 | Ali | ....................... | G06F 13/4226 709/224 |
| 2011/0271151 A1* | 11/2011 | Stevens | ............... | G06F 11/0745 714/50 |
| 2017/0123659 A1* | 5/2017 | Nam | .................... | G06F 13/4282 |
| 2017/0286205 A1* | 10/2017 | Jeong | .................... | G06F 3/0619 |
| 2017/0315943 A1* | 11/2017 | Benisty | ............... | G06F 12/1081 |
| 2018/0074973 A1* | 3/2018 | Chan | ........................ | G06F 11/00 |
| 2018/0088841 A1* | 3/2018 | Ma | ........................ | G06F 3/0619 |

* cited by examiner

*Primary Examiner* — Hong C Kim
(74) *Attorney, Agent, or Firm* — F. Chau & Associates, LLC

(57) ABSTRACT

A solid-state drive (SSD) for handling an Asynchronous Event Request (AER) command includes a command receiving circuit and a command management circuit. The command receiving circuit is configured to receive at least one command from at least one host. The command management circuit is configured to determine if the received at least one command from the at least one host is an AER command, store the AER command into an AER queue reserved for deferred AER command handling, if the received at least one command is the AER command, and generate a dummy response for the AER command and release resources occupied by the AER command.

20 Claims, 7 Drawing Sheets

METHOD AND SYSTEM FOR HANDLING AN ASYNCHRONOUS EVENT REQUEST COMMAND IN A SOLID-STATE DRIVE

CROSS-REFERENCE TO RELATED APPLICATION

This application claims priority under 35 U.S.C. § 119 to Indian Patent Application No. 201741004479, filed on Feb. 7, 2017 in the Indian Patent Office, the disclosure of which is incorporated by reference herein in its entirety.

TECHNICAL FIELD

Exemplary embodiments of the inventive concept relate to storage systems/solid-state drives (SSD), and more particularly, to methods and storage systems for asynchronous Event Request (AER) command handling in bare metal multi-core Peripheral Component Interconnect Express (PCIe) based SSDs that supports multipath input/output (I/O) and single root input/output virtualization (SR-IOV).

DISCUSSION OF RELATED ART

An entity, which is able to interact with a controller by sending commands as per the Non-Volatile Memory Express (NVMe) specification, may be referred to as a host. The NVMe or Non-Volatile Memory Host Controller Interface Specification (NVMHCI) is a logical device interface specification for accessing non-volatile storage media attached through a Peripheral Component Interconnect Express (PCIe) bus. FIG. 1 illustrates a host and a controller associated with a single PCIe function that can process commands and send an appropriate response to the host as per the NVMe specification. FIG. 2 depicts a solid-state drive (SSD) with a single controller. The SSD may have a single controller, where the SSD does not support Single Root Input/Output Virtualization (SR-IOV) capabilities or multi-path capabilities via physical ports.

FIG. 3 illustrates a SSD with multiple controllers where the SSD is a PCIe based device SSD supporting SR-IOV. The PCIe based SSD may have multiple controllers, if the SSD supports SR-IOV capabilities. The PCIe based SSD that supports SR-IOV feature can support multiple functions. The PCIe based SSD has one physical function and four virtual functions. An NVMe controller is associated with each virtual function where each NVMe controller may have a private namespace (e.g., NS A to NS D) as well as access to a namespace shared by all NVMe controllers (e.g., NS E). The host can issue as many Asynchronous Event Request (AER) command(s) as per the value broadcasted in an Asynchronous Event Request Limit (AERL). An AERL field of Identify controller data may be given by the PCIe based SSD as part of the Identify controller response. The AERL field can specify a maximum number of AER commands that can be issued by a host to the controller. The NVMe specification recommends that controller implementations shall support a minimum of four outstanding AER commands.

FIG. 4 illustrates a PCIe based SSD connected with multiple hosts, such as Host A, Host B, and Host C. The PCIe based SSD can have multiple controllers such as NVM Express Controller 1, NVM Express Controller 2, NVM Express Controller 3, and NVM Express Controller 4. The Host A is associated with two controllers while the Host B and the Host C are each associated with a single controller. A Host Identifier (ID) associated with each controller can allow the PCIe based SSD to identify controllers associated with the same host and preserve reservation properties across these controllers (e.g., a host issued command has the same reservation rights no matter which controller associated with the host processes the command).

In an existing approach, a host can send the AER command during an SSD initialization stage. As the AER command works in an asynchronous mode, the host will not be expecting an immediate response and the AER command has no timeout. Therefore, the SSD will hold the resources occupied by the AER command within the SSD until an AER occurs or a reset to the controller is triggered by the host.

A PCIe based SSD may support multiple functions. For example, if the PCIe based SSD supports "M" functions, then "M" NVMe controllers may be provided and each NVMe controller has an AERL of 4. Thus, M*4 resources may be held permanently in the PCIe based SSD, if there is no reset or occurrence of an asynchronous event in the PCIe based SSD. This may result in starvation of resources as the resource occupied by the AER command is not released.

SUMMARY

According to an exemplary embodiment of the inventive concept, a solid-state drive (SSD) for handling an Asynchronous Event Request (AER) command includes a command receiving circuit and a command management circuit. The command receiving circuit is configured to receive at least one command from at least one host. The command management unit is configured to determine if the received at least one command from the at least one host is the AER command, store the AER command into an AER queue reserved for deferred AER command handling, if the received at least one command is the AER command, and generate a dummy response for the AER command and release resources occupied by the AER command.

According to an exemplary embodiment of the inventive concept, a method for handling an Asynchronous Event Request (AER) command in a SSD (solid-state Drive) includes receiving, by the SSD, at least one command from at least one host, determining, by the SSD, if the received the received at least one command is an AER command, storing, by the SSD, the AER command into an AER queue reserved for deferred AER command handling, if the received at least one command is the AER command, and generating, by the SSD, a dummy response for the AER command to release resources occupied by the AER command.

According to an exemplary embodiment of the inventive concept, in a method for handling an Asynchronous Event Request (AER) command in a solid-state drive (SSD) including a command receiving circuit and a command management circuit, the method includes receiving, by the command receiving circuit, at least one command from at least one host, determining, by the command management circuit, the received at least one command is an AER command, determining, by the command management circuit, the AER command is logically correct for processing and there is no outstanding AER event available for the at least one host, storing, by the command management circuit, the AER command into a first AER queue reserved for deferred AER command handling, and sending an AER response, by the command management circuit, to the at least one host when an asynchronous event occurs in the SSD.

BRIEF DESCRIPTION OF THE DRAWINGS

The above and other features of the inventive concept will become more apparent by describing in detail exemplary embodiments thereof with reference to the accompanying drawings.

DETAILED DESCRIPTION OF THE EMBODIMENTS

Figure 1:
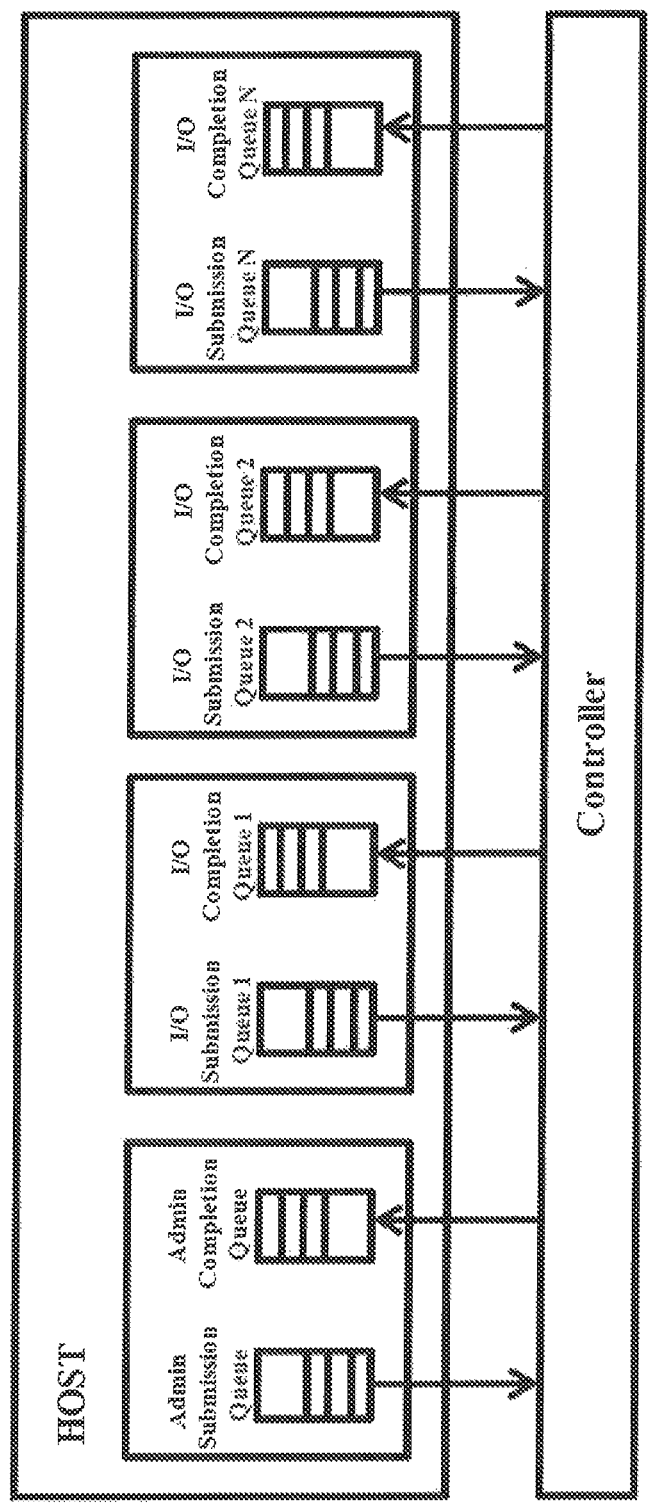
FIG. 1 illustrates a host and a controller associated with a single Peripheral Component Interconnect Express (PCIe) function.
Figure 2:
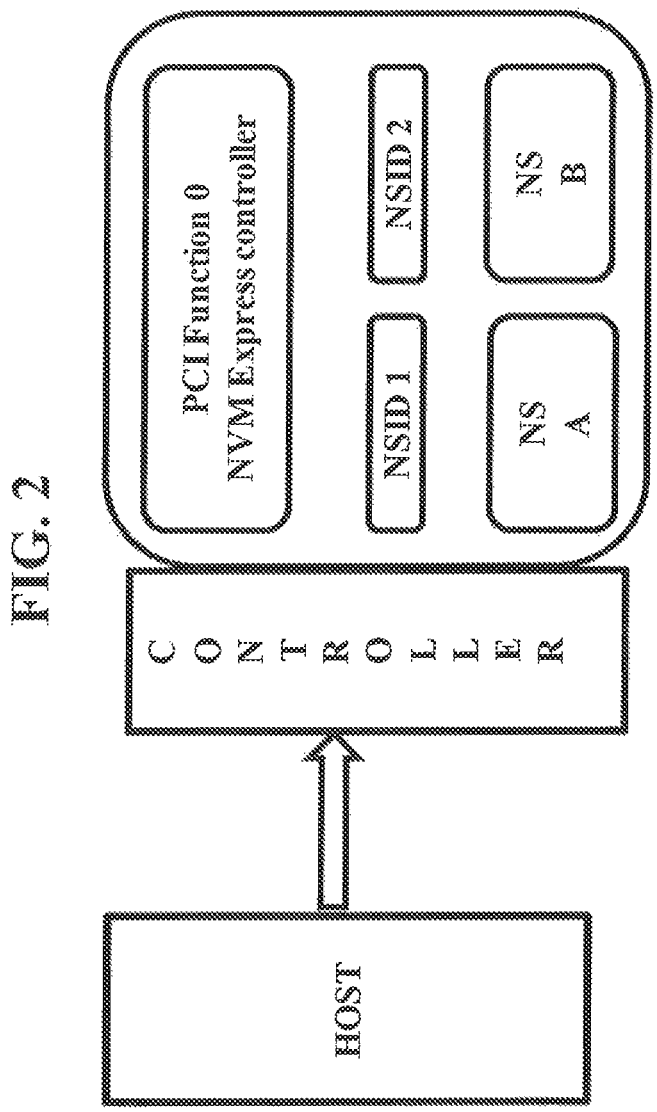
FIG. 2 illustrates a solid-state drive (SSD) with a single controller.
Figure 3:
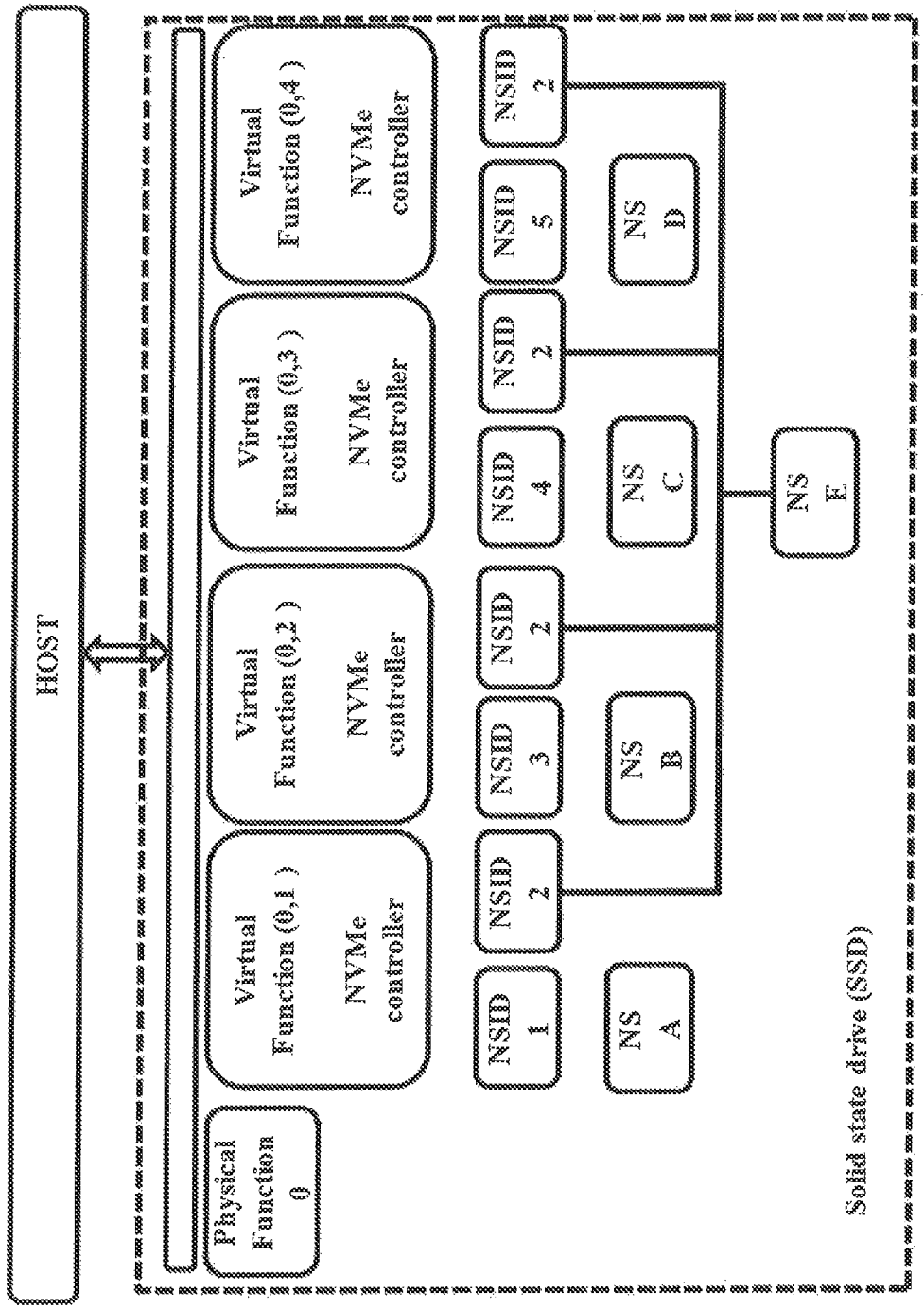
FIG. 3 illustrates a SSD with multiple controllers.
Figure 4:
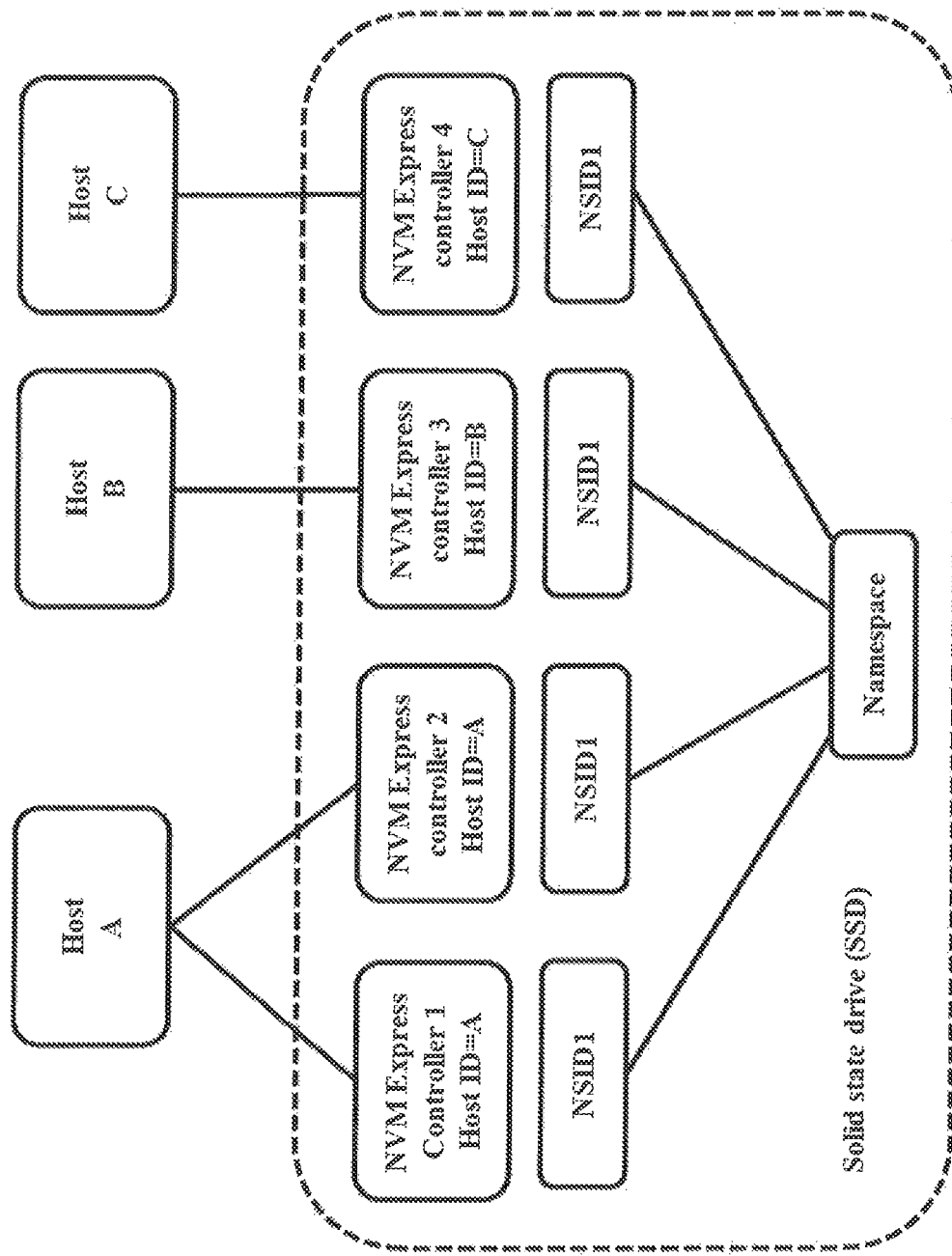
FIG. 4 illustrates a PCIe based SSD connected with multiple hosts.

Exemplary embodiments of the inventive concept provide methods and storage systems for asynchronous event request (AER) command handling in a bare metal multi-core Peripheral Component Interconnect Express (PCIe) based solid-state drive (SSD) that supports multipath input/output (I/O) and single root I/O virtualization (SR-IOV).

Exemplary embodiments of the inventive concept provide a method for handling an AER command in a SSD. The method includes receiving one or more command(s) by the SSD from one or more host(s). Additionally, the method includes determining, by the SSD, if the received one or more command(s) from the one or more host (s) is the AER command. The method also includes storing the AER command into an AER queue reserved for deferred AER command handling, if the received at least one command from the at least one host is the AER command. The method further includes generating and transmitting a dummy command completion response for the AER command to an NVMe controller to release resources occupied by the AER command.

Exemplary embodiments of the inventive concept will be described more fully hereinafter with reference to the accompanying drawings, particularly, FIGS. 5 through 7. Like reference numerals may refer to like elements throughout this application.

Figure 5:
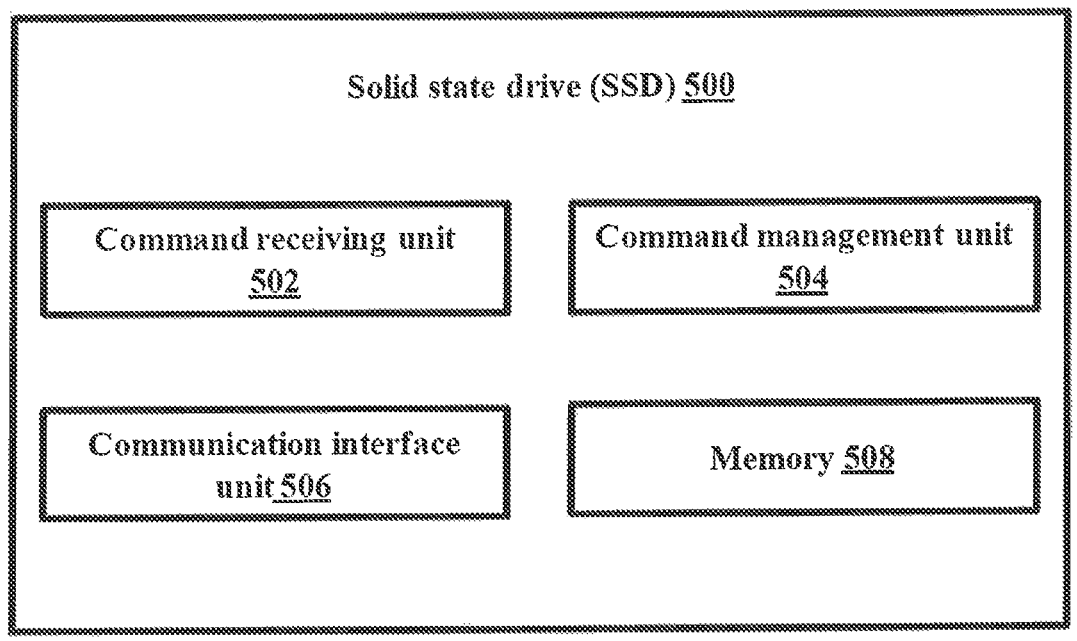
FIG. 5 is a block diagram illustrating an SSD, according to an exemplary embodiment of the inventive concept.

FIG. 5 is a block diagram illustrating an SSD according to an exemplary embodiment of the inventive concept. An SSD 500 can be connected to one or more host(s), wherein the one or more host(s) can issue one or more commands. The one or more command(s) includes one or more input output (I/O) commands (e.g., data transfer commands) and one or more AER commands (e.g., admin commands). The commands issued by the one or more host(s) can be handled by an associated controller (e.g., an NVMe controller) in the SSD 500. The SSD 500 can have multiple controllers to handle the commands issued by the one or more host(s).

In an exemplary embodiment of the inventive concept, the SSD 500 includes a command receiving unit 502, a command management unit 504, a communication interface unit 506, and a memory 508. The SSD 500 may be a bare metal multi-core PCIe based SSD that has multiple controllers and supports multipath I/0 and SR-IOV. Each of the command receiving unit 502, the command management unit 504, and the communication interface unit 506 may be circuits in the SSD 500.

The command receiving unit 502 can be configured to receive at least one command from at least one host. The command management unit 504 can be configured to determine whether the received at least one command from the at least one host is an AER command. Further, the command management unit 504 can be configured to store the AER command into an AER queue reserved for deferred AER command handling when it is determined that the received at least one command is the AER command. Additionally, the command management unit 504 can be configured to generate a dummy response for the received AER command and to release resources occupied by the AER command. Moreover, the command management unit 504 can be configured to send an AER response to the at least one host when an asynchronous event occurs in the SSD 500 at a later point in time. The communication interface unit 506 can be configured to establish a communication between the one or more host(s) and the SSD 500. The host(s) can issue one or more command(s) for the SSD 500 through the communication interface unit 506. The memory 508 can be internal to the SSD 500, and can be configured to store one or more command(s) from the one or more host(s).

FIG. 5 shows exemplary units of the SSD 500, but the inventive concept is not limited thereto. For example, the SSD 500 may include less or more units. Further, the labels or names of the units are only for illustrative purposes and do not limit the scope of the inventive concept. One or more units can be combined together to perform a same or substantially similar function in the SSD 500.

Figure 6:
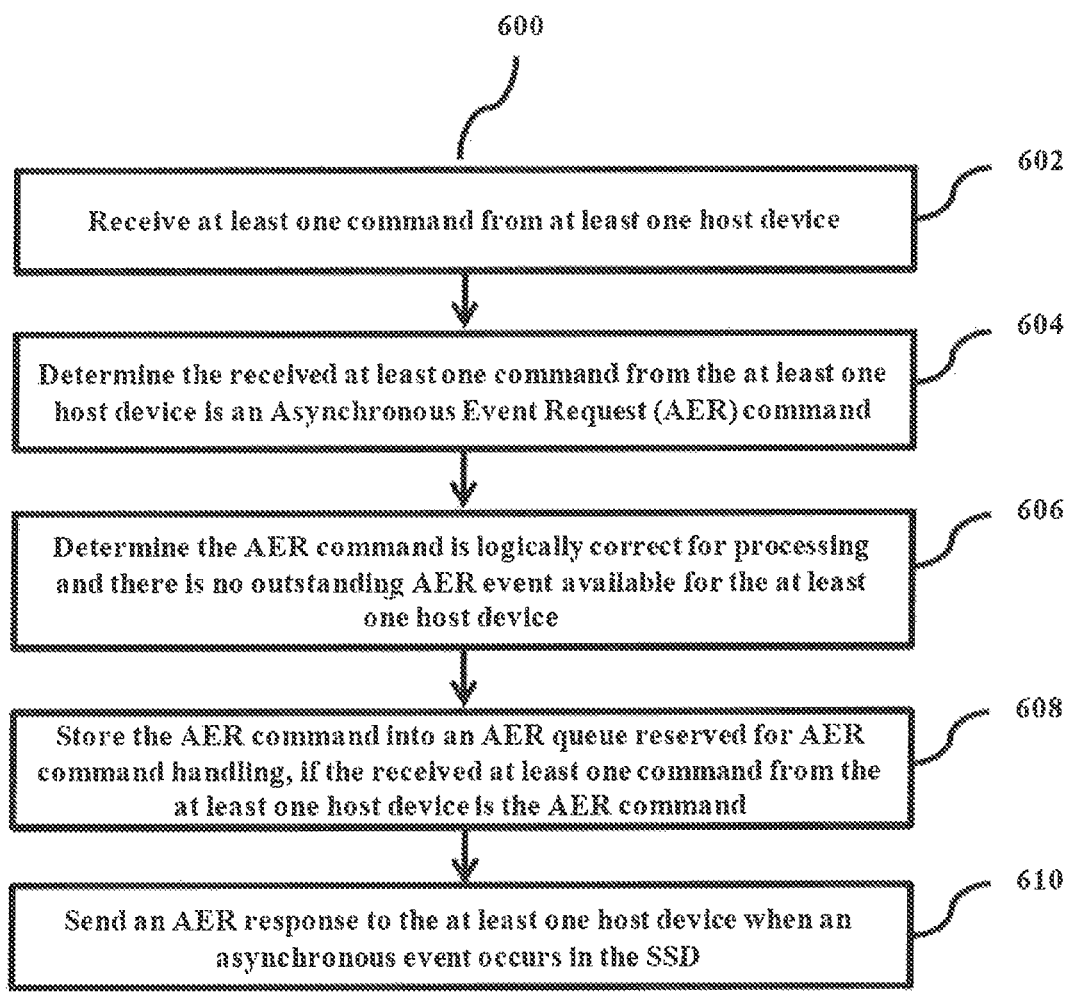
FIG. 6 is a flow diagram illustrating a method for handling an Asynchronous Event Request (AER) command in the SSD of FIG. 5, according to an exemplary embodiment of the inventive concept.

FIG. 6 is a flow diagram illustrating a method for handling an AER command in the SSD of FIG. 5, according to an exemplary embodiment of the inventive concept. A flow diagram 600 in FIG. 6 may include operations 602, 604, 606, 608, and 610.

In operation 602, the method includes receiving one or more command(s) from one or more host(s). For example, the method allows the command receiving unit 502 to receive the one or more command(s) from the one or more host(s).

In operation 604, the method includes determining if the received one or more command(s) from the one or more host(s) is an AER command. For example, the method allows the command management unit 504 to determine if the received one or more command(s) from one or more host(s) is the AER command.

In operation 606, the method includes determining if the AER command is logically correct for processing and there is no outstanding AER event available for the corresponding host. For example, the method allows the command management unit 504 to determine if the AER command is logically correct for processing and there is no outstanding AER event available for the corresponding host.

In operation 608, the method includes storing the AER command into an AER queue reserved for AER command handling if the received at least one command from the one or more host(s) is the AER command. For example, the method allows the command management unit 504 to store the AER command into the AER queue reserved per controller for deferred AER command handling.

In operation 610, the method includes sending an AER response to the one or more host(s) when an asynchronous event occurs in the SSD 500. For example, the method allows the command management unit 504 to send the AER response to the one or more host(s) when an asynchronous event occurs in the SSD 500.

The various operations, actions, acts, blocks, steps, or the like in the method of the flow diagram 600 may be performed in the order presented, in a different order, or simultaneously. Further, in exemplary embodiments of the inventive concept, some of the operations, actions, acts, blocks, steps, or the like may be omitted, added, modified, skipped, or the like without departing from the scope of the inventive concept.

Figure 7:
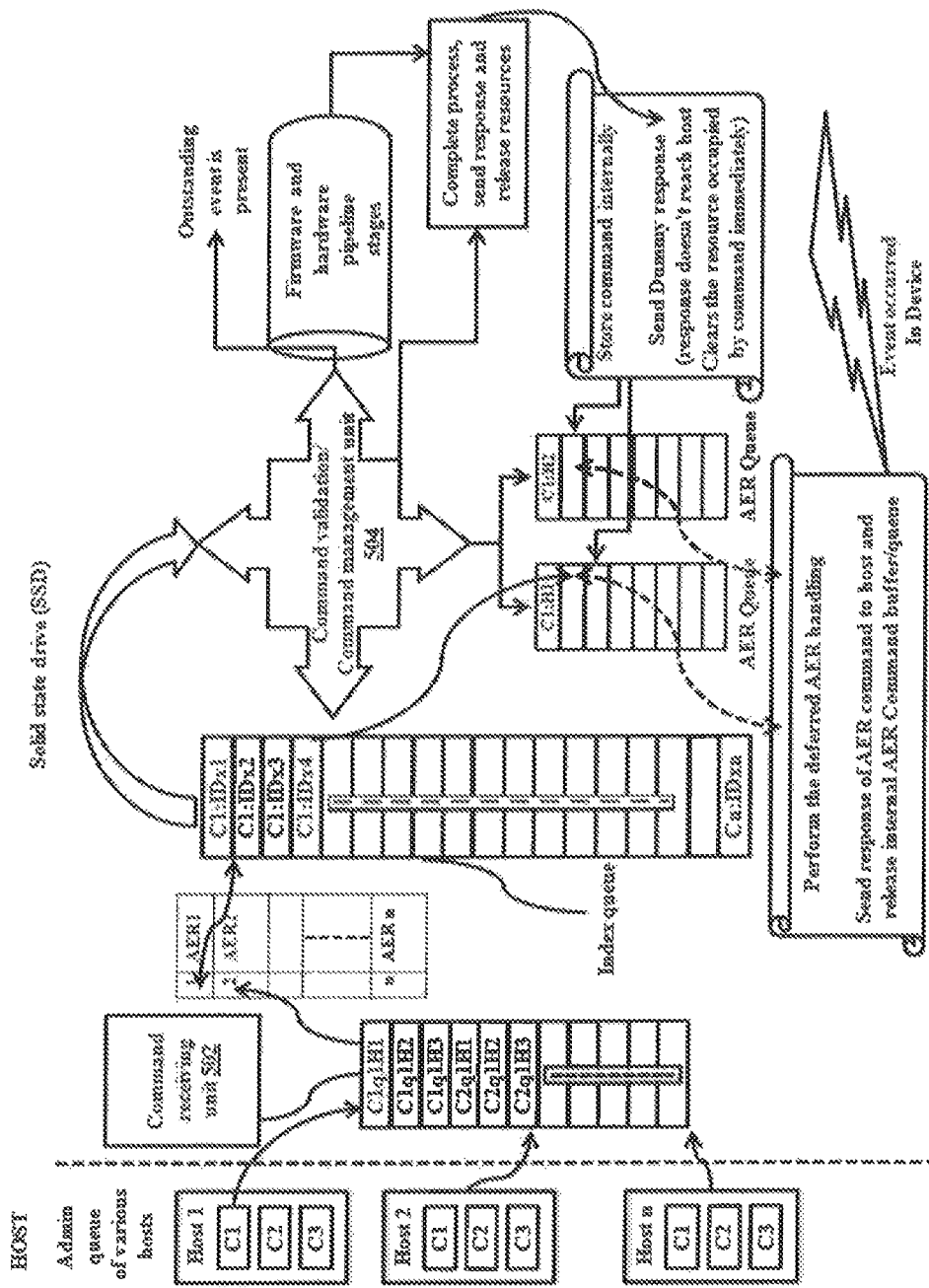
FIG. 7 illustrates an example scenario of handling AER commands in the SSD of FIG. 5, according to an exemplary embodiment of the inventive concept.

FIG. 7 illustrates an example scenario of handling AER commands in the SSD of FIG. 5, according to an exemplary embodiment of the inventive concept. The command receiving unit 502 can be configured to receive at least one command from the at least one host. Further, the received command is fetched into the processing queue for further processing. Additionally, the received command is mapped to an index queue. The command management unit 504 (alternatively referred to as a command validation unit) can be configured to determine whether the received command is the AER command and whether the received AER command is logically correct for processing. On determining by the command management unit 504 that the received at least one command is the AER command, the command management unit 504 can be configured to determine whether there is any outstanding AER event available in the SSD 500 for the at least one host. If the command management unit 504 determines that there is already an AER event available for the at least one host, the command management unit 504 processes the AER command and provides the response to the respective host then. If the command management unit 504 determines that there is no outstanding event available in the SSD 500 for the corresponding host, the command management unit 504 can be configured to store the AER command into the AER queue reserved for deferred AER command handling according to the corresponding controller.

In an exemplary embodiment of the inventive concept, the AER queues are different for different hosts, e.g., there is a dedicated AER queue available for each individual controller which in turn maps to a particular host. Further, the command management unit 504 can be configured to generate a dummy command response for the received AER command to a controller to release resources occupied by the AER command. In other words, the dummy response is generated to release the hardware resources occupied by the AER command. However, the dummy response is not posted to the at least one host which sent the AER command. Further, if the command management unit 504 determines an asynchronous event in the SSD 500, the command management unit 504 checks the AER queue available for AER command handling for an outstanding AER command. If the command management unit 504 identifies an outstanding AER command, the command management unit 504 sends the response for the outstanding AER command.

For example, when firmware of the SSD 500 receives the AER command for execution, the firmware validates for command correctness. If the AER command is logically correct for processing and there is no outstanding AER event pending, the AER command is stored into the AER queue for deferred AER command handling. Resources used by that AER command are released by the firmware immediately. Further, when an asynchronous event occurs, the firmware will get information of the event through an interrupt, scan its stored AER command, and take appropriate action by sending a response to the AER command. In an exemplary embodiment of the inventive concept, when a reset request is triggered from the host, the firmware invalidates all outstanding AER commands stored internally.

Accordingly, exemplary embodiments of the inventive concept avoid starvation of resources that can arise because of resource occupancy by AER commands. Additionally, exemplary embodiments of the inventive concept can support a higher number of outstanding AER commands in an SSD.

Exemplary embodiments of the inventive concept can be implemented through at least one software program running on at least one hardware device and performing network device management functions to control network and device elements. The network elements shown in FIG. 5 and FIG. 7 include blocks, which can be at least one of a hardware sub module, or a combination of hardware sub modules and software modules.

In other words, the various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concept has been shown and described with reference to exemplary embodiments thereof, it will be apparent to those of ordinary skill in the art that various modifications in form and details may be made thereto without departing from the spirit and scope of the inventive concept, as set forth by the following claims.

What is claimed is:

1. A solid state drive (SSD) for handling an Asynchronous Event Request (AER) command, the SSD comprising:
   a command receiving circuit configured to receive at least one command from at least one host; and
   a command management circuit configured to:
   determine if the received at least one command from the at least one host is an AER command;
   store the AER command into an AER queue reserved for deferred AER command handling, if the received at least one command is the AER command; and
   generate a dummy response for the AER command and release resources occupied by the AER command.

2. The SSD of claim 1, wherein the command management circuit is further configured to send an AER response to the at least one host when an asynchronous event occurs in the SSD.

3. The SSD of claim 1, wherein the command management circuit is configured to store the AER command into the AER queue by:

determining the AER command is logically correct for processing and there is no outstanding AER event available for the at least one host; and storing the AER command into the AER queue.

4. The SSD of claim 1, wherein the received at least one command is at least one of the AER command and an input output (I/O) command.

5. The SSD of claim 1, wherein the SSD is a bare metal multi-core peripheral component interconnect express (PCIe) based SSD including multiple controllers and supporting multipath input/output (I/O) and single root input/output virtualization (SR-IOV).

6. A method for handling an Asynchronous Event Request (AER) command in a solid-state drive (SSD), the method comprising:

receiving, by the SSD, at least one command from at least one host;

determining, by the SSD, if the received at least one command is an AER command;

storing, by the SSD, the AER command into an AER queue reserved for deferred AER command handling, if the received at least one command is the AER command; and generating, by the SSD, a dummy response for the AER command to release resources occupied by the AER command.

7. The method of claim 6, wherein the method further comprises sending an AER response, by the SSD, to the at least one host when an asynchronous event occurs in the SSD.

8. The method of claim 6, wherein storing the AER command into the AER queue comprises:

determining, by the SSD, the AER command is logically correct for processing and there is no outstanding AER event available for the at least one host; and storing, by the SSD, the AER command into the AER queue.

9. The method of claim 6, wherein the received at least one command is at least one of the AER command and an input output (I/O) command.

10. A method for handling an Asynchronous Event Request (AER) command in a solid-state drive (SSD) including a command receiving circuit and a command management circuit, the method comprising:

receiving, by the command receiving circuit, at least one command from at least one host;

determining, by the command management circuit, the received at least one command is an AER command;

determining, by the command management circuit, the AER command is logically correct for processing and there is no outstanding AER event available for the at least one host;

storing, by the command management circuit, the AER command into a first AER queue reserved for deferred AER command handling; and sending an AER response, by the command management circuit, to the at least one host when an asynchronous event occurs in the SSD.

11. The method of claim 10 further comprising:

generating, by the command management circuit, a dummy response for the AER command to release hardware resources occupied by the AER command; and transmitting the dummy response to a controller included in the SSD.

12. The method of claim 11, wherein the dummy response is not posted to the at least one host.

13. The method of claim 11, wherein the controller is a Non-Volatile Memory Express (NVMe) controller.

14. The method of claim 10, when a reset request is triggered from the at least one host, the SSD invalidates all outstanding AER commands stored internally therein.

15. The method of claim 10, wherein the SSD further includes a memory and the memory is configured to store the at least one command from the at least one host.

16. The method of claim. 10, wherein the SSD includes a plurality of AER queues including the first AER queue, and each of the plurality of AER queues is mapped to one of a plurality of hosts including the at least one host.

17. The method of claim 10, wherein the received at least one command is at least one of the AER command and an input output (I/O) command.

18. The method of claim 10, wherein the SSD is a bare metal multi-core peripheral component interconnect express (PCIe) based SSD including multiple controllers and supporting multipath input/output (I/O) and single root input/output virtualization (SR-IOV).

19. The method of claim 10, wherein the SSD further includes a communication interface unit configured to establish communication between the at least one host and the SSD.

20. The method of claim 10, wherein the received at least one command is mapped to an index queue.

* * * * *